United States Patent
Winstead et al.

(10) Patent No.: US 6,301,489 B1
(45) Date of Patent: Oct. 9, 2001

(54) FLAT BLADE ANTENNA AND FLIP ENGAGEMENT AND HINGE CONFIGURATIONS

(75) Inventors: Russell Evans Winstead, Raleigh; James D. MacDonald, Jr., Apex; Nils Rydbeck, Cary, all of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/217,142

(22) Filed: Dec. 21, 1998

(51) Int. Cl.[7] .................. H04B 1/38; H04M 1/00
(52) U.S. Cl. .............. 455/562; 455/550; 455/575; 455/129; 455/269; 343/702; 379/433
(58) Field of Search .................. 455/575, 550, 455/562, 129, 269; 343/702; 379/433

(56) References Cited

U.S. PATENT DOCUMENTS

| | | | |
|---|---|---|---|
| D. 318,050 | 7/1991 | Elbaz et al. | D14/138 |
| D. 347,221 | 5/1994 | Siddoway | D14/138 |
| D. 352,503 | 11/1994 | Nagele | D14/138 |
| D. 367,062 | 2/1996 | Tahmassebpur | D14/230 |
| D. 379,356 | 5/1997 | Liu et al. | D14/230 |
| D. 382,873 | 8/1997 | MacDonald, Jr. et al. | D14/138 |
| D. 398,611 | 9/1998 | Read | D14/230 |
| D. 407,716 | 4/1999 | Park | D14/138 |
| D. 421,017 | 2/2000 | Phipps | D14/230 |
| D. 421,402 | 3/2000 | Solenthaler | D10/104 |
| 4,121,218 | 10/1978 | Irwin et al. | 343/702 |
| 4,471,493 | 9/1984 | Schober | 455/90 |
| 4,992,799 | 2/1991 | Garay | 343/702 |
| 5,260,998 | 11/1993 | Takagi | 379/433 |
| 5,337,061 | 8/1994 | Pye et al. | 343/702 |
| 5,374,937 | 12/1994 | Tsunekawa et al. | 343/702 |
| 5,507,013 | 4/1996 | Weadon et al. | 455/90 |
| 5,572,223 | 11/1996 | Phillips et al. | 343/702 |
| 5,583,519 | 12/1996 | Koike | 343/702 |
| 5,630,211 | * 5/1997 | Nagai | 455/575 |
| 5,651,063 | 7/1997 | Ji et al. | 379/433 |
| 5,659,888 | 8/1997 | Kato et al. | 455/475 |
| 5,659,889 | 8/1997 | Cockson | 455/575 |
| 5,779,496 | 7/1998 | Bolinger et al. | 439/377 |
| 5,828,343 | 10/1998 | MacDonald, Jr. et al. | 343/702 |
| 5,838,789 | 11/1998 | Mendolia | 379/433 |
| 5,907,306 | 5/1999 | Karabinis et al. | 343/702 |
| 5,936,587 | 8/1999 | Gudilev et al. | 343/752 |
| 5,943,021 | * 8/1998 | Hayes et al. | 343/702 |
| 5,978,655 | 11/1999 | Ohura et al. | 455/41 |
| 5,995,052 | * 11/1999 | Sadler et al. | 343/702 |
| 6,016,125 | 1/2000 | Johansson | 343/702 |
| 6,031,503 | 2/2000 | Preiss, II et al. | 343/770 |
| 6,043,794 | 3/2000 | Faulkner et al. | 343/872 |
| 6,107,968 | * 8/1998 | Stalgren et al. | 343/702 |

FOREIGN PATENT DOCUMENTS

| | | |
|---|---|---|
| 2191143A | 6/1997 | (CA) . |
| 0415703A1 | 3/1991 | (EP) . |
| 0 613 207 A1 | 2/1994 | (EP) . |
| 0 634 806 A1 | 6/1994 | (EP) . |
| 2 213 998 A | 8/1989 | (GB) . |
| 2 253 949 A | 9/1992 | (GB) . |
| 2317993A | 4/1998 | (GB) . |
| WO 94/19873 | 9/1994 | (WO) . |
| WO 98/01919 | 1/1998 | (WO) . |
| WO 98/09342 | 3/1998 | (WO) . |
| WO 98/12772 | 3/1998 | (WO) . |

\* cited by examiner

*Primary Examiner*—Nay Maung
*Assistant Examiner*—L West
(74) *Attorney, Agent, or Firm*—Myers Biel Sibley & Sajovec, P.A.

(57) ABSTRACT

Radiotelephones include flat blade antennas and flip configurations. The flat blade antenna and flip are mounted to the radiotelephone via dual hinges. The flat blade antenna is configured to be captured by the flip to define a cover in the stow position. The flat blade antenna rotates separate from the flip. The flat blade antenna opens to an angular position greater than the adjacently mounted flip.

33 Claims, 11 Drawing Sheets

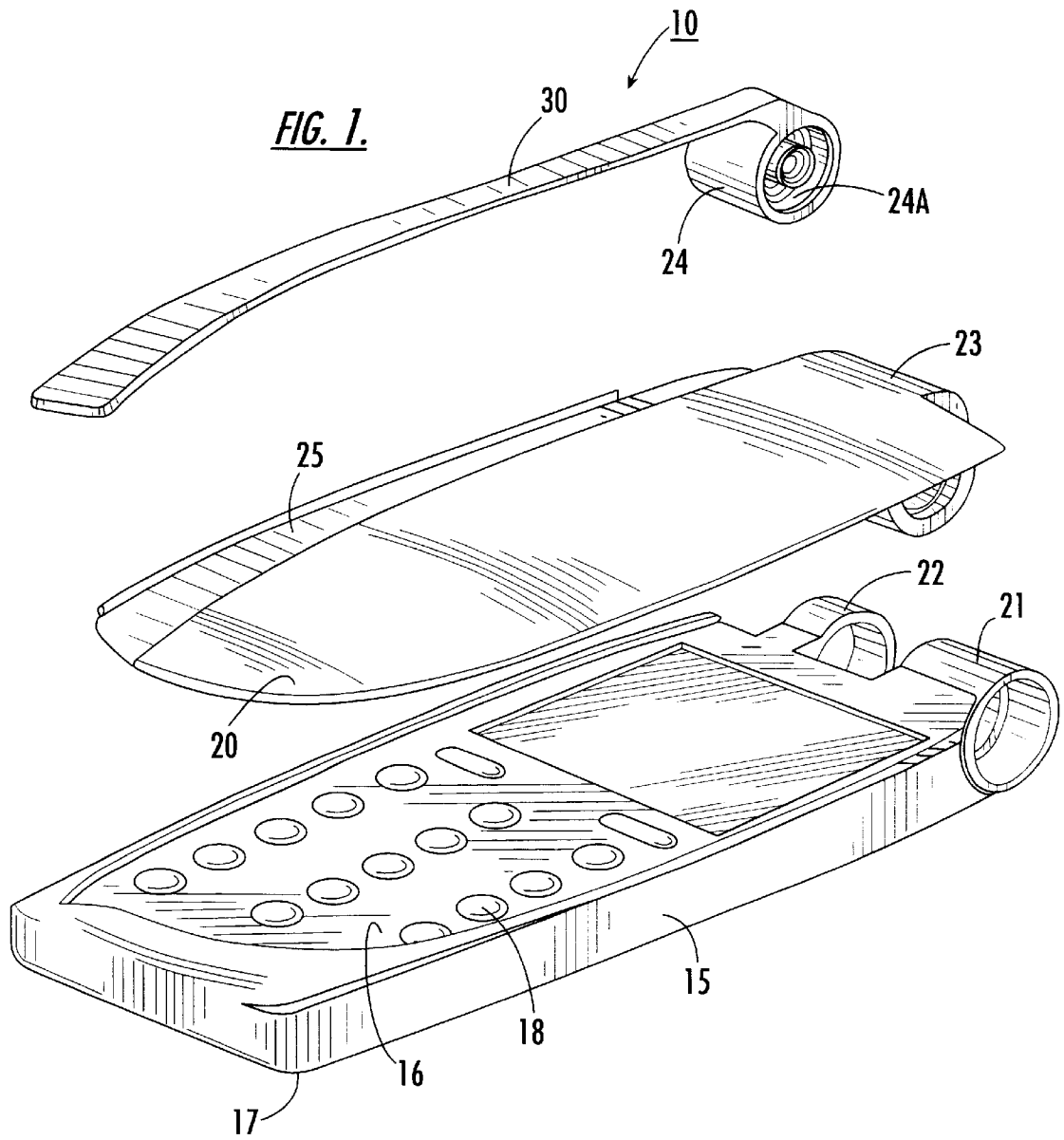

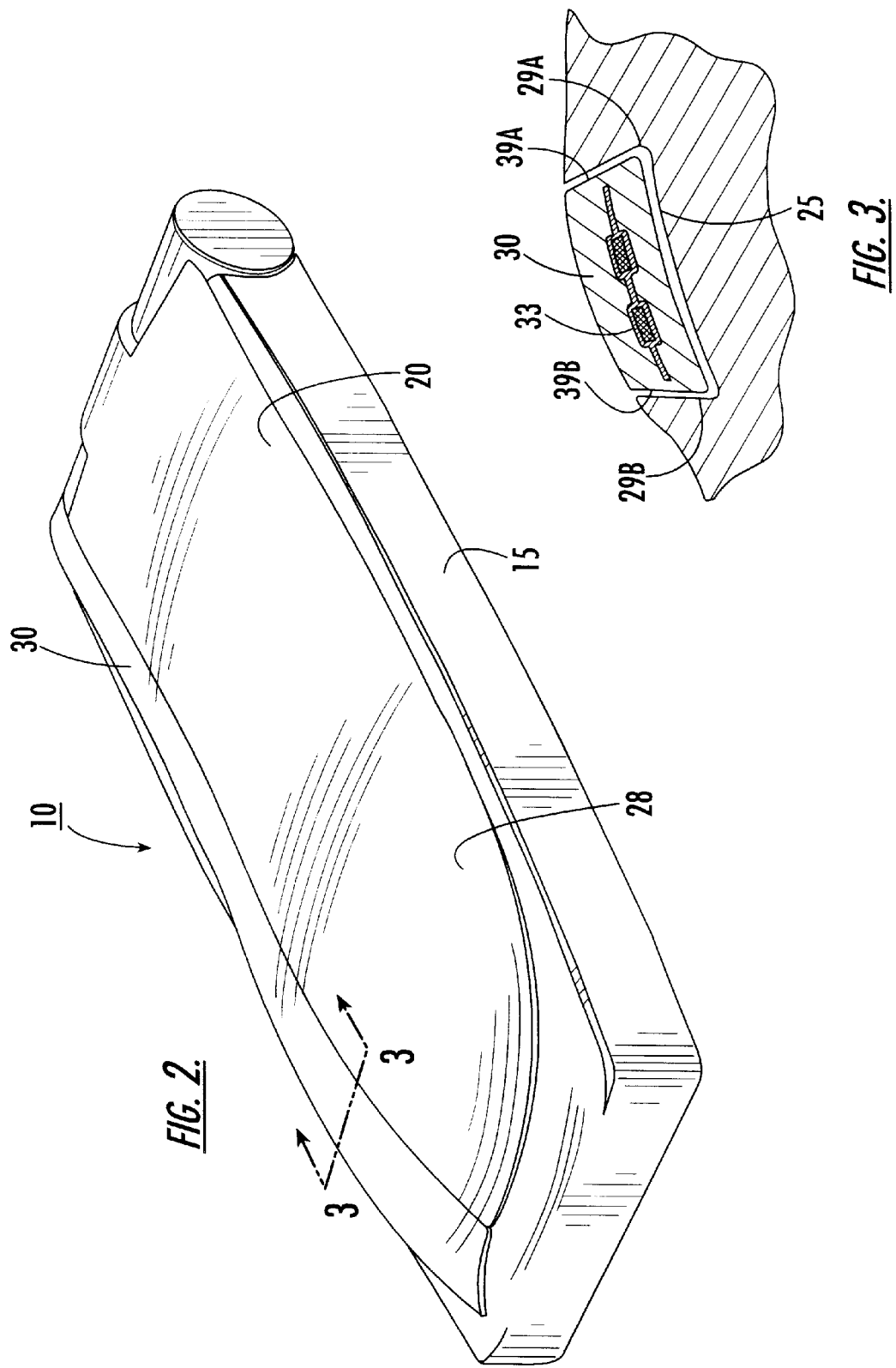

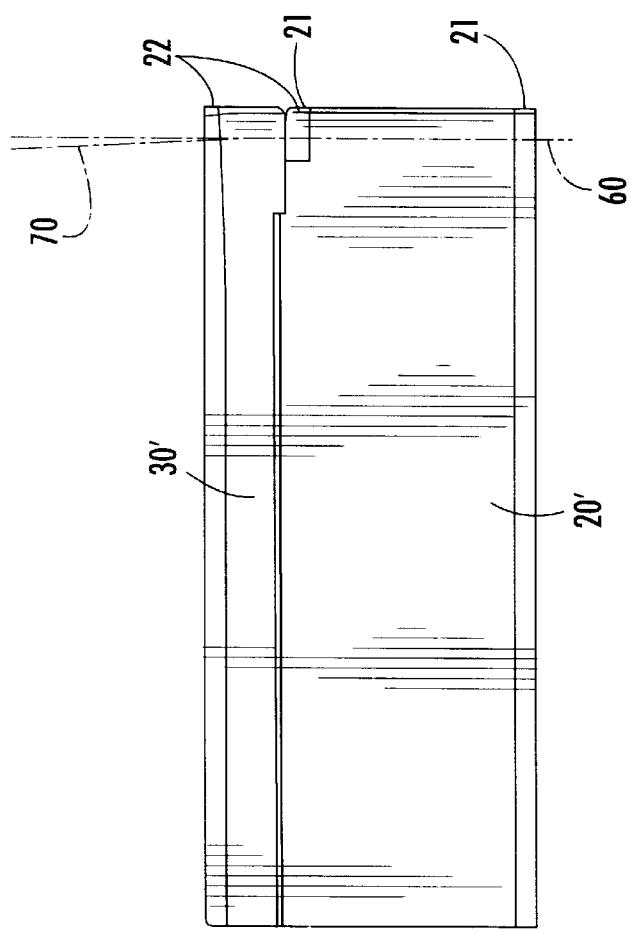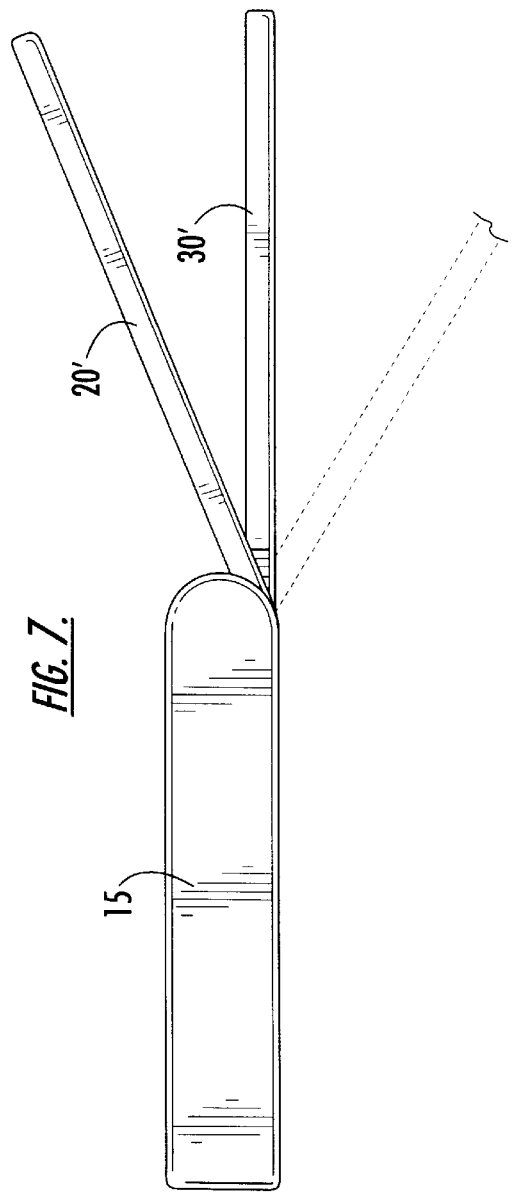

FLAT BLADE ANTENNA AND FLIP ENGAGEMENT AND HINGE CONFIGURATIONS

FIELD OF THE INVENTION

The present invention relates generally to communication devices, and more particularly to radiotelephones.

BACKGROUND OF THE INVENTION

Recent radiotelephones have incorporated low profile designs. Low profile designs typically include a thin lightweight cover member which "flips" over the radiotelephone body when the radiotelephone is closed and "flips" above and away from the radiotelephone body when the radiotelephone is opened. As such, this member is called a "flip." The radiotelephone also includes an antenna element which during operation extends above the radiotelephone body. Radiotelephones have conventionally used various types of antennas such as side-mounted swivel antennas and telescoping antennas. In any event, the antenna and flip typically stow adjacent to the radiotelephone body when closed and extend above the radiotelephone body when opened.

In a preferred low-profile application, the antenna is configured as a flexible "blade" or "strip"(i.e., a flexible strip transmission line) radiating element which can be very narrow, thin, and flexible. The blade antenna can rotate and extend similar to the flip described above. However, this flexibility can result in unwanted deformation and unappealing gaps in the cover when the flip and antenna are in the closed or stow position. Further, during use, the blade antenna can be subjected to use or abuse which can misalign or deform the blade or strip antenna. As such, over time, it can be very difficult for the flip and strip antenna to maintain a desirable aesthetic cover shape that can repeatedly rotate between the open and closed positions.

In addition, in operation, the blade antenna and the flip typically rotate above and away from the radiotelephone body such that a user can position the flip adjacent his or her ear. Unfortunately, extension of the strip antenna adjacent the flip can subject the radiotelephone to reduced sensitivity due to blocked signals or interference caused by the position of the antenna relative to the user's anatomy (typically the head).

OBJECTS AND SUMMARY OF THE INVENTION

It is therefore an object of the invention to provide a low-profile flip and strip or blade antenna configuration which is compact and tolerant of repeated openings and closings.

It is also an object of the present invention to provide an improved flip and strip antenna configuration defines a secure and aesthetically pleasing cover when the radiotelephone is closed.

It is an additional aspect of the invention to provide a radiotelephone with an improved flip and flexible strip antenna mounting structure which can reduce the interference associated with the user during operation.

It is still another object of the present invention to provide a radiotelephone with a strip antenna which has improved sensitivity and is configured to reduce interference associated with the position of the antenna in use over that of conventional antennas used with flip radiotelephones.

These and other objects of the present invention are satisfied by the present invention, which is directed to a radiotelephone having a flat blade antenna and flip matably configured and/or a dual-hinge mounting structure for the flat blade antenna and flip. A first aspect of this invention is directed toward a radiotelephone having a radiotelephone housing with opposing top and bottom surfaces. A strip antenna is attached to the housing such that it is rotatable from a first closed position to a second open position. The radiotelephone also includes a flip member attached to the housing. The flip member is rotatable from a first closed position to a second open position. When each of the strip antenna and the flip are in the closed position, the strip antenna and flip are configured to releasably engage together. Preferably, in the closed position, the flip member and the strip antenna define a substantially continuous cover which overlies a major portion of at least one surface of the radiotelephone.

A second aspect of the invention is directed toward a radiotelephone housing having a blade antenna and flip member. The housing includes a primary radiotelephone body having opposing first and second end portions. The housing also includes a blade antenna having an antenna hinge portion. The antenna hinge portion is pivotably attached to the body first end such that the blade antenna rotates to longitudinally extend above the primary radiotelephone body in an open position and rotates to overlie a portion of the primary radiotelephone body in a stow position. The housing also includes a flip member having a flip hinge portion. The flip hinge portion is pivotably attached to the body first end portion such that the flip member rotates to longitudinally extend above the primary radiotelephone body in an open position and rotates to overlie the primary radiotelephone body adjacent the blade antenna in a stow position.

An additional aspect of the present invention is a method of operating a low-profile radiotelephone having a strip antenna and flip member with a speaker thereon. The method includes rotating the flip member a first distance above and away from the radiotelephone body. Rotating the strip antenna a second distance above and away from the radiotelephone body such that the second distance is further or greater than the first distance (i.e., the antenna opens past the flip member). The strip antenna and flip member are then stowed to overlay the radiotelephone such that the strip antenna and flip member matably engage and form a cover over the radiotelephone. Preferably, the flip member and strip antennas define a continuous cover in the stow position.

The present invention is advantageous because the interlocking flip and antenna structure can protect the flexible blade antenna from deformation, handling abuse and wear, and provides an appealing aesthetic appearance. In addition, the rotation of the blade antenna separate from the flip allows the antenna to be positioned during use such that it minimizes interference with the anatomy of the user.

BRIEF DESCRIPTION OF THE DRAWINGS

FIG. 1 is an exploded perspective view of a radiotelephone according to the present invention.

FIG. 2 is a perspective view of the radiotelephone of FIG. 1 with the flip and strip antenna in a closed or stow position.

FIG. 3 is a sectional view of the line taken with along line 3—3 in FIG. 2 showing the strip antenna captured and securely held in the flip member.

FIG. 7 is a side perspective view of a radiotelephone showing the strip antenna opening a greater angular distance from the radiotelephone body than the flip according to the present invention.

FIG. 7A is a top view of the radiotelephone of FIG. 7, showing a non-coaxial dual hinge configuration according to the present invention.

DETAILED DESCRIPTION OF THE INVENTION

Figure 4:
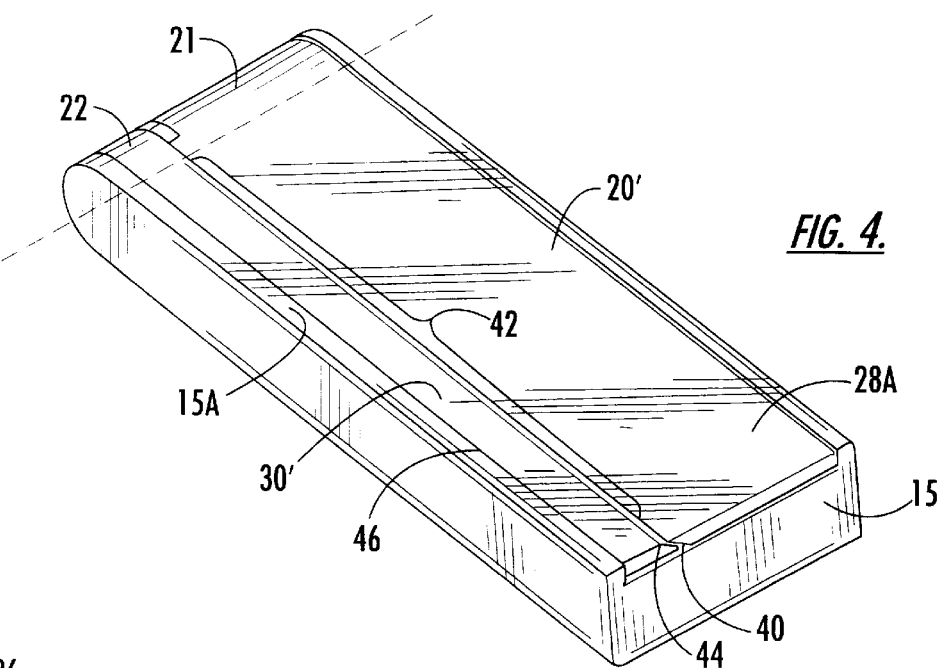
FIG. 4 is a perspective view of an alternate embodiment of a strip antenna and flip attached to a radiotelephone according to the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. Layers and regions may be exaggerated for clarity.

In the application, certain terms have been used to describe the positional relationships of certain of the features. As used herein, the term "longitudinal" and derivatives thereof refer to the general direction defined by the longitudinal axis of the radiotelephone that extends between opposing top and bottom ends of the radiotelephone body when held in the hand of a user. As used herein, the terms "outer," "outward," "lateral" and derivatives thereof refer to the direction defined by a vector originating at the longitudinal axis of the radiotelephone and extending horizontally and perpendicularly thereto. Conversely, the terms "inner," "inward," and derivatives thereof refer to the direction opposite that of the outward direction. Together the "inward" and "outward" directions comprise the "transverse" direction.

Referring now to FIG. 1, a preferred embodiment of a radiotelephone 10 is illustrated. As shown, the radiotelephone 10 includes a radiotelephone body or housing 15, a flip 20, and a strip antenna 30. The radiotelephone body 15 includes top and bottom surfaces 16, 17 with a user interface portion 18 on the top surface 16. As shown in FIGS. 1, 4, 5, 7A, the radiotelephone body 15 also preferably includes hinging portions 21, 22 (alternatively shown as 221, 222 in FIGS. 12 and 18) on a top edge portion of the housing 15. In a preferred embodiment, the flip 20 and the strip antenna 30 are each separately pivotably mounted to the hinging portions 21, 22 on the top edge of the radiotelephone body 15. As such, the flip 20 includes a flip hinge 23 and the strip antenna 30 includes a strip hinge 24. The hinges 23, 24 are sized and configured to align and pivotally mate with the corresponding stationary hinging portions 21, 22 on the radiotelephone body 15, as will be discussed further below.

Referring again to FIG. 1, in this preferred embodiment, the flip 20 is configured with a recessed portion 25 which is configured to receive at least a portion of the length of the strip antenna 30, and preferably a major portion of the length of the strip antenna, when the strip antenna 30 and flip 20 are in the stow or closed position. As such, as shown in FIG. 2, in operation, the flip 20 and strip antenna 30 rotate to matably engage and preferably define a continuous outer cover 28 with an aesthetically desirable arched profile which overlays the top surface 16 of the radiotelephone body. Also preferably, the cover 28 securely and releasably attaches to the radiotelephone body 15.

FIG. 3 illustrates a preferred embodiment of an engagement surface or mechanism for the strip antenna 30 and the flip 20. As shown, the recessed portion 25 of the flip includes at least one and preferably two opposing undercut side portions 29A, 29B configured to matably engage with and capture correspondingly beveled sides or edges 39A, 39B of the strip antenna. The strip antenna 30 is preferably a flexible and resilient structure and includes an antenna element 33 positioned in between overmolded non-conducting outer layers as will be discussed further below. As the flexible strip antenna 30 can be subject to deformation during use, the advantageous locking configuration of the flip 29A, 29B forces the strip antenna 30 substantially back into its preferred original shape due to the mating alignment with the flip recessed portion 25. The locking engagement forces the strip antenna 30 to conform to the substantially rigid shape of the recess in the flip 20.

FIG. 4 illustrates an alternate preferred embodiment of a strip antenna 30' and flip 20'. As shown, this embodiment includes a side-by-side or adjacently configured flip 20' and strip antenna 30'. Similar to the embodiment discussed above, the flip 20' is configured to trap at least a portion of the adjacently positioned antenna 30'. As shown in FIG. 4, the side of the flip 20' adjacent the antenna is configured with a slight undercut 40. The undercut 40 preferably runs along a major portion of the length of the flip 20' and defines a strip antenna contact edge portion 42 which matably engages with an adjacent strip antenna side or lateral portion 44 when the antenna 30' and flip 20' are closed. Preferably, as shown in FIG. 4, the adjacent strip antenna side portion 44 has a beveled edge which is sized and configured to securely abut and rest against the undercut of the flip 40 when in the stow position. Thus, the strip antenna side portion 44 is effectively captured and held by the substantially rigid undercut 40.

It is also preferred that the opposing side 46 of the strip antenna (the side away from the flip 20') is configured to firmly abut and rest against a raised projection 15A on the radiotelephone housing 15 such that the strip antenna is sandwiched between the flip 20' on one side and the raised area of the housing 15 on the other. Advantageously, this raised projection 15A can serve as an edge protector for the antenna. This configuration also preferably defines a substantially continuous cover 28A when the radiotelephone is in the closed or stow position. Stated differently, the outer surface of the radiotelephone is aesthetically configured to minimize any gap between the strip antenna 30' and the flip 20'. Of course, as will be appreciated by those of skill in the art, other flip and antenna shapes and configurations can also be employed within the scope of the instant invention.

Figure 5:
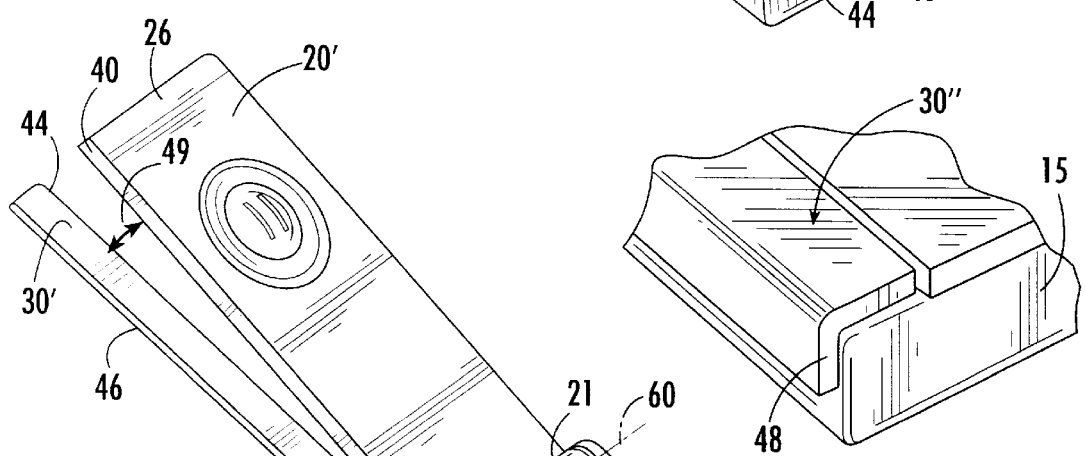
FIG. 5 is a partial perspective view of an additional embodiment of a strip antenna and flip according to the present invention.

FIG. 5 illustrates yet another embodiment of the strip antenna 30". As shown, the strip antenna includes a side 48 which is sized and configured to wrap around the side of the radiotelephone body 15. Of course, alternatively or in addition, the flip 20 could also be configured with one or more wrap-around sides (not shown). In the embodiment shown, it is preferred that the wrap-around side 48 is configured to minimize interference with gripping surfaces utilized by the user. It is also preferred that the side 48 include a housing engagement or locking surface (not shown) to protect the flexible antenna 30' from handling abuses by keeping it securely positioned against the rigid housing when stowed.

It is also preferred that the flip 20' and or antenna 30' be configured to releasably lock against the body of the radiotelephone 15 when in the stow position. For example, the end of the flip 26 opposite the hinges 23, 24 can be configured to snap into a locking recess formed in the radiotelephone body (not shown). The locking recess can be formed by configuring the top surface of the radiotelephone with a cutout or recess matching the shape of the tip of the strip or blade (not shown), and preferably includes a co-molded thermoplastic elastomer (TPE) lining to facilitate a firm and secure closing. Alternatively, other additional locking configurations or mechanisms can be used to secure the cover or the flip or antenna to the housing in the closed position. For example, the cover can be configured with a front or side extension, such as a tapered pin, which engages with a spring loaded catch or which is spring loaded itself (not shown) to releasably engage the housing when the cover 28A is closed and can easily release when the flip 20 (and/or antenna) rotates away from the radiotelephone body.

Figure 6:
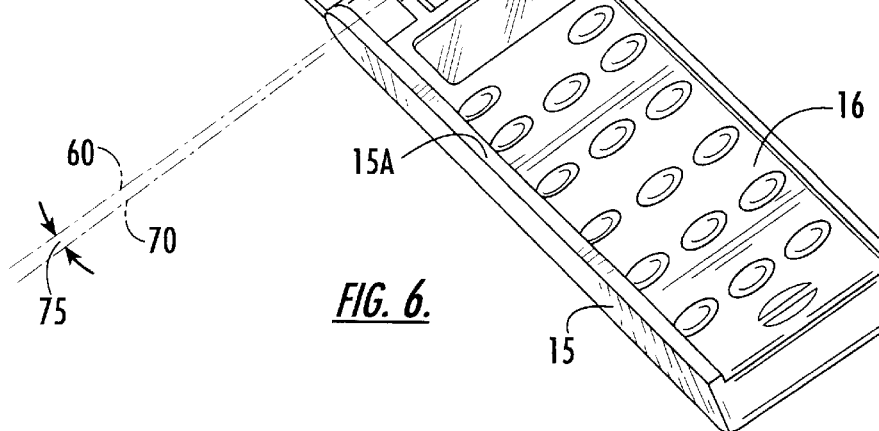
FIG. 6 is a perspective view of the radiotelephone of FIG. 4 in an open position.

FIG. 6 illustrates the radiotelephone of FIG. 4 in an open position. As shown, the deployed strip antenna 30' and flip 20' have separated. Because the radiotelephone preferably includes two hinges (i.e., a dual hinge design), one each for separately pivoting the strip antenna and the flip 22, 21, respectively, the strip antenna 30' can be positioned spaced-apart from the flip 20' in the open position. Advantageously, the separation can allow the antenna 30' to be positioned in such a way as to minimize the potential interference associated with the anatomy of the user. For example, as shown in FIG. 6, the flip includes a speaker 50 which is typically positioned adjacent the ear of the user during standard operation. Absent such a dual hinge configuration, the antenna would typically rotate concurrent with the flip and be positioned proximate to the user's head. Configuring the strip antenna 30' such that it is free to rotate separate from the flip 20', allows the strip antenna 30' to be spaced-apart at the longitudinal end of the antenna 49 and also rotate a greater angular distance away from the flip (and thus the user) (FIG. 7). This configuration advantageously minimizes the interference associated with the user and can improve the sensitivity of the radiotelephone.

Also shown in FIGS. 6 and 7A, in a preferred embodiment, the flip hinge 21 has a flip hinge axis 60 and the strip antenna hinge 22 has a strip antenna hinge axis 70. As shown, the flip hinge axis 60 is preferably non-coaxial/ misaligned or offset from the strip antenna hinge axis 70. More preferably, the offset 75 is about or approximately three degrees. As shown in FIG. 6, the offset or non-coaxial arrangement of the two hinge axes 60, 70 is preferably designed such that the adjacent edges of the flip and antenna separate during opening and advance towards the other during closure to re-align and form the substantially continuous cover 28A. Stated differently, the two axes of rotation extend across the radiotelephone surface such that they intersect at an intersection point (or are configured that one approaches the other such that they nearly intersect). Preferably, the angle of intersection of the flip hinge axis and the antenna hinge axis is about or approximately three degrees. Of course, as shown in FIG. 4, the hinge axes 60, 70 can also be arranged so as to be coaxial. Any of the hinge or pivot configurations also apply to other strip antenna and flip shapes such as the flip 20 and strip antenna 30 shown in FIG. 1.

Figure 7B:
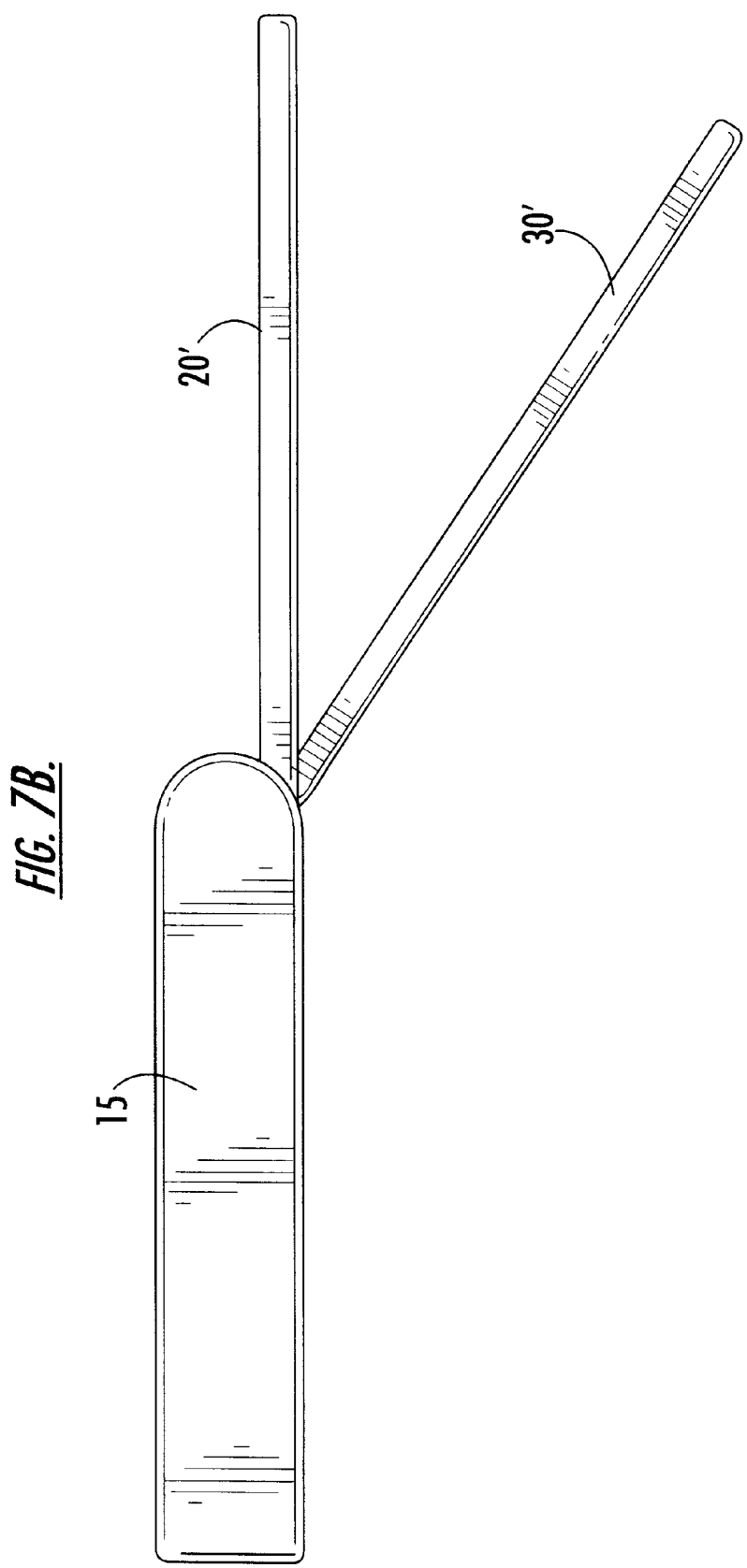
FIG. 7B is a side perspective view of the radiotelephone in FIG. 7, showing alternate positions of the flip and antenna.

In a preferred embodiment, as shown in FIGS. 7 and 7B, the strip antenna 30' opens to a greater angle (travels through a greater angle of rotation as it moves from the stow to the open position) than the flip 20' relative to the axis of rotation defined with respect to the radiotelephone body. Preferably, the antenna 30' opens about 30–60 degrees and preferably about 35–50 degrees greater than the flip 20' in the fully open position. As noted above, the separation provided by the increased movement of the antenna 30' relative to the flip 20' can minimize interference associated with a user. In a preferred embodiment, as shown in FIG. 7, the strip antenna 30' opens to rotate about 210 degrees from the closed position while the flip 20' rotates to about 160 degrees from the closed position (from the radiotelephone body) relative to the axis of rotation. This provides an angular separation or clearance of about 50 degrees between the antenna and flip when both the flip 20' and antenna 30' are in the (fully) open or active operative position (away from the radiotelephone body). FIG. 7B shows an additional preferred embodiment, with the antenna 30' positioned at about 210 degrees and the flip 20' at about 180 degrees from the radiotelephone body. This provides an angular separation of about 30 degrees.

Figure 11:
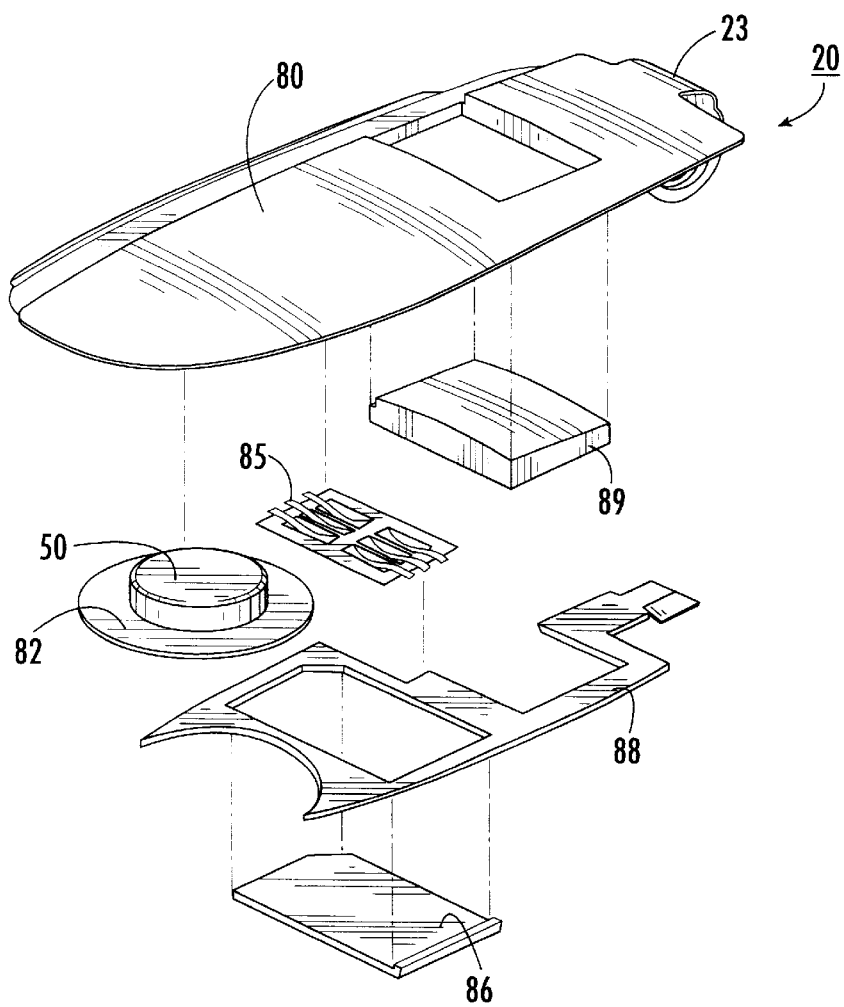
FIG. 11 is an exploded view of a flip assembly according to the present invention.

As discussed above, the flip 20 includes a speaker 50 positioned such that it is easily accessible by a user in operation (when open). FIG. 11 illustrates a preferred embodiment of a flip assembly 20 according to the present invention. As shown, the flip assembly 20 includes a substantially rigid housing 80, a speaker 50, an associated diaphragm 52, a SIM card frame 85, a SIM card door 86, and a window 89. Generally stated, the assembly components are attached to the housing 80 and held in place by a flip cover 88. The assembly can also include a flex circuit such as that designated at 230 in FIG. 12.

Figure 8:
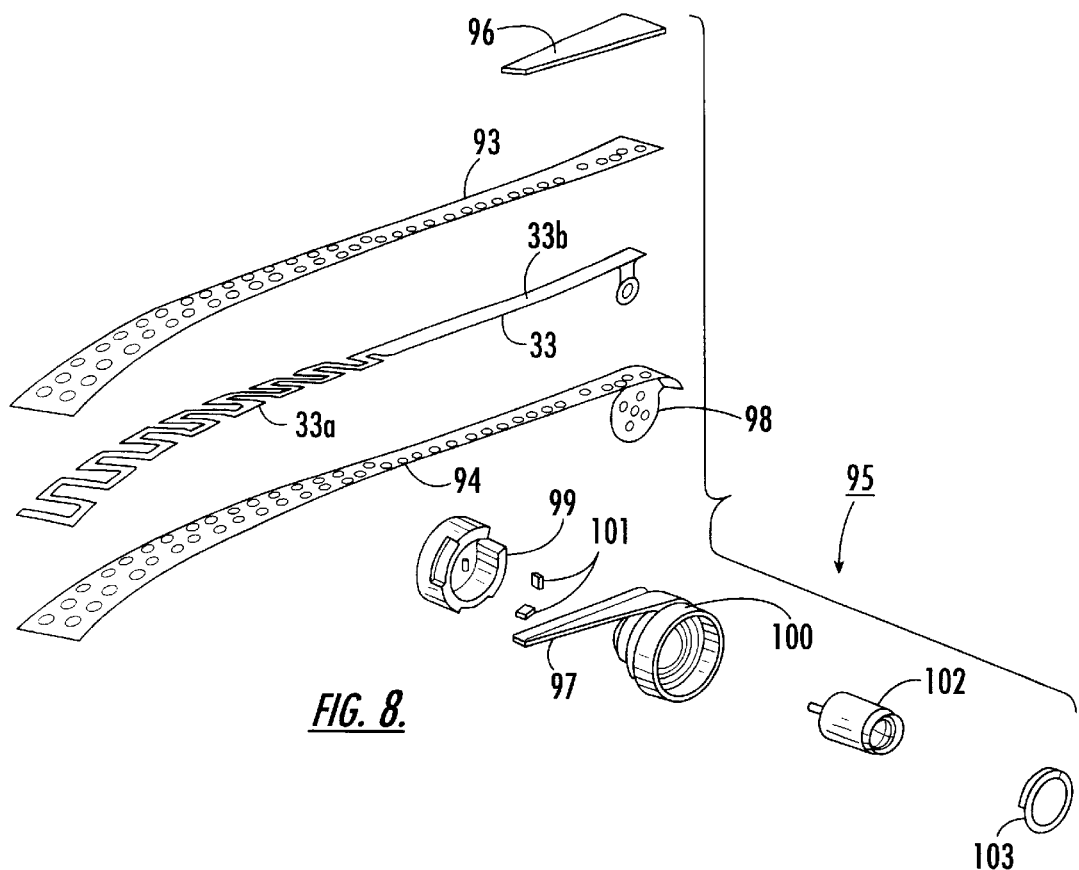
FIG. 8 is an exploded perspective view of a strip antenna according to the present invention.

FIG. 8 shows a preferred embodiment of a flexible strip antenna 30 according to the instant invention. It is preferred that the antenna 30 have a high degree of flexibility in order to decrease the size of the radiotelephone mounting structure over that typically needed to handle loads encountered in conventional blade antennas. The higher loads can be attributed to the conventional blade's limited stiffness. By utilizing highly flexible strip antenna structures, the radiotelephone mounting structures can be reduced in size and weight. The reduced size and weight are particularly desired features in portable devices and are even more particularly desired with "pocket phones."

Accordingly, the instant invention preferably includes a flexible substrate for the radiating electrical element 33. More preferably, the substrate is formed of a super flexural Ni—Ti (a highly flexible alloy). Alternatively, other materials could be used as the radiating element, such as, but not limited to, copper or beryllium alloys, foil and the like. In one embodiment, the radiating element is formed from 0.35–0.4 mm diameter Ni—Ti wire or 0.10–0.30 mm thick sheet. For example, the element is formed from 0.14 mm thick wire Raychem Tinel™ B—B material arranged in a substantially planar square wave pattern 33a (or meander pattern) which terminates to a linear pattern 33b along the length of the strip antenna 30. As the strip or flat blade antenna preferably has a minimal thickness, mechanical strength and durability is therefore preferably provided by proper selection of materials in order to yield a functional flexible radiating electrical structure. In a preferred embodiment, as shown in FIG. 8, the radiating element 33 is sandwiched between nylon cloth or screen layers 93, 94 which are typically attached to the radiating element via a compression molded thermoplastic elastomer (TPE) which fills and overcoats the structure. A retainer 96 can also be used to overlay a portion of the top nylon layer 93 to provide additional structure. In one embodiment the retainer 96 is manufactured from a molded type 6 nylon and is bonded with a urethane adhesive to the outer surface of the top layer 93 prior to overmolding.

In a preferred embodiment, the radiating element 33 is covered with an open nylon cloth or screen and bonded with a TPE overmold. The nylon cloth outer layer is preferably overmolded (via compression molding) with a thermoplastic elastomer (TPE) such as Santoprene™ type 101–80A. The nylon melts and bonds to the elastomer overmold thereby forming a suitable flexible mechanical structure able to resist repeated bending. Preferably, TPE is also pushed through the cloth openings during molding, thereby creating a suitable mechanical structure. Alternately, a primer layer of TPE may be applied prior to molding. Preferably, the thickness of the layers 33, 93, 94 are sized and formed to prevent the bending strain in the radiating element 33 (such as in the Ni—Ti alloy) from exceeding about 10% and more preferably about 8% of ultimate strain. This design parameter can reduce the potential of material yield and the potential for permanent set which can occur when the antenna is subjected to mechanical abuse.

Alternatively, a flex circuit element can be used (not shown). In this embodiment, a flex circuit having about 0.15 mm nominal thickness can be used with nylon mesh reinforcement protective layers as described above. Again, the antenna is preferably compression molded to provide an overmolded antenna element. Optionally, the flex circuit can be molded without the nylon layers. See co-pending and co-assigned U.S. Patent Applications entitled, "Flexible Strip Transmission Line," "A Rigid and Flexible Flat Antenna," and "A Termination Contact For An Antenna With a Nickel-Titanium Radiating Element," identified by U.S. patent application Ser. Nos. 08/798,137, 09/017,660 and 09/017,658, respectively, the disclosures of which are hereby incorporated by reference as if recited in full herein.

Figure 9:
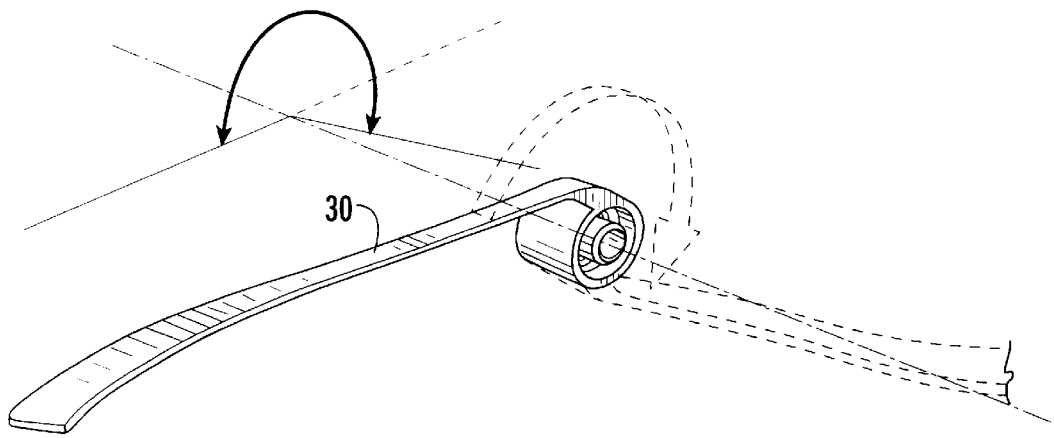
FIG. 9 is a perspective view of the antenna subassembly of FIG. 8 according to the present invention.
Figure 12:
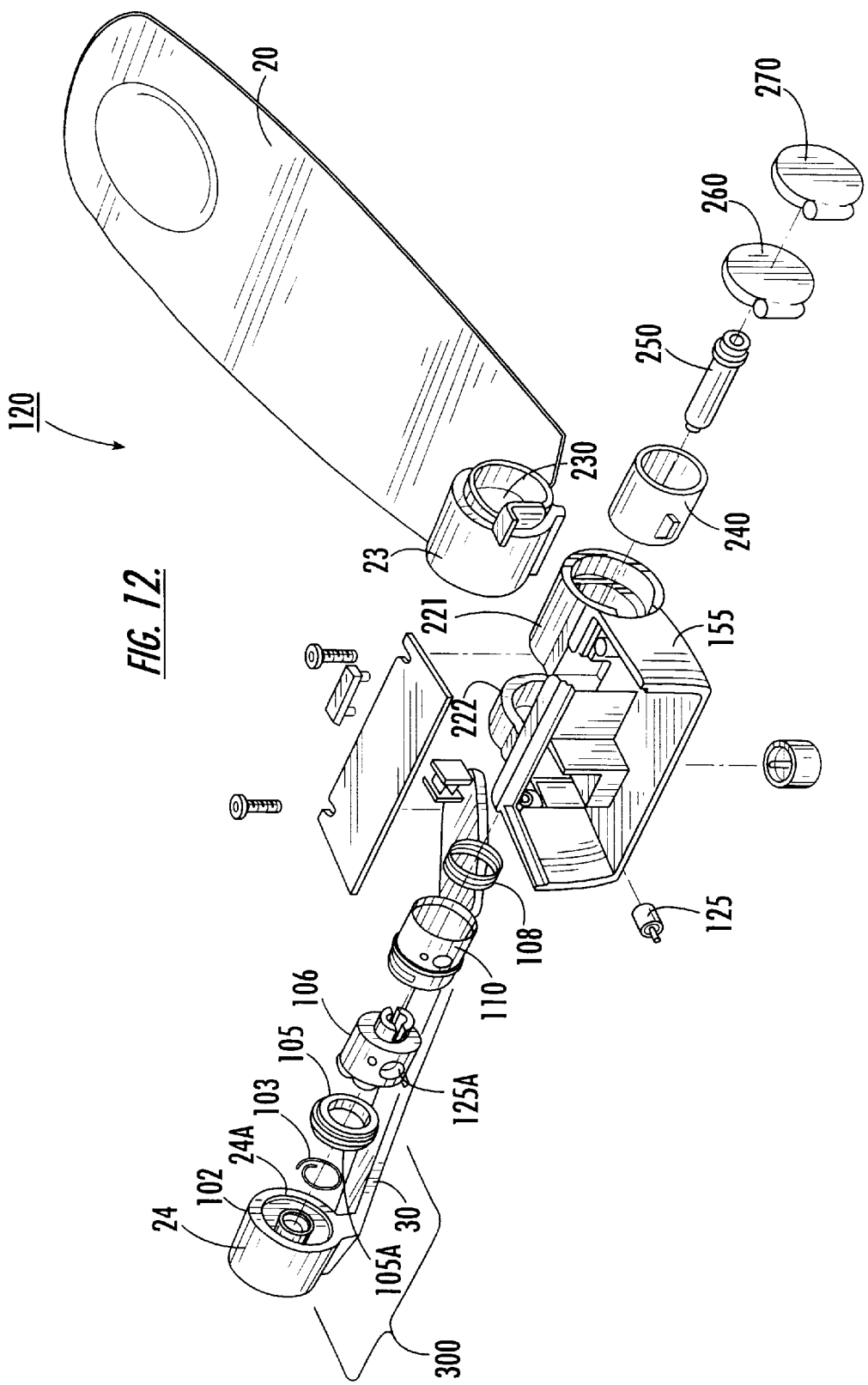
FIG. 12 is an exploded view of a flip and antenna and hinge assembly according to the present invention.

Referring again to FIG. 8, a preferred embodiment of an antenna mounting structure 95 is also shown. The bottom outer layer 94 preferably includes an extending portion 98 which is connected to a molded shell 100. The molded shell 100 preferably includes a bottom retainer portion 97 which, in position, will preferably lie underneath the upper retainer 96 and contact the bottom surface of the lower layer 94. As such, the upper retainer 96 and bottom retainer portion 97 attach the lower portion of the antenna to the shell 100. The antenna mounting structure 95 also preferably includes an end cap 99, circuit matching components 101, a rotary male RF connector 102, and a (detent) spring 103. FIG. 9 illustrates the mounting structure 95 of FIG. 8 partially assembled with the antenna 30 (defining an antenna sub-assembly 300). FIG. 9 also shows the preferred opening and closing positions of the antenna 30 with respect to the axis of rotation (i.e., 0 degrees at closing and 210 degrees at fully open). FIG. 12 additionally illustrates a detent cam 105 and a female RF connector 106 according to a preferred antenna mounting structure. The detent cam 105 and RF connector 106 are mounted to the frame designated at 155 in FIG. 12 of the radiotelephone. The male RF connector 102 is inserted into the female RF connector 106. The female connector is operably associated with a RF feed 125 (FIG. 12) that connects to the circuitry of the radiotelephone. In operation, the spring 103 and the sub-assembly 300 rotate in response to a user activating the radiotelephone and extending the antenna 30, while the RF connector 106 and detent cam 105 remain stationary.

Figure 10:
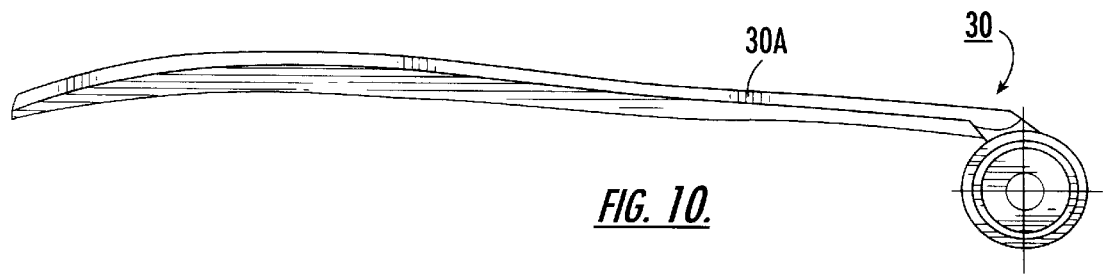
FIG. 10 is an enlarged side view of an arched strip antenna according to the present invention.

FIG. 10 illustrates a preferred contour or arched antenna profile 30A. This profile is preferably chosen to wrap around the flip contour with a minimum volume. The flip contour is preferably chosen to provide a contour which provides an aesthetically pleasing and continuous profile for the components held in the flip (such as the speaker). As such, as shown in FIG. 1, the flip recess 25 and associated locking surface or feature 29A are preferably configured to receive the arched profile of the antenna 30A such that the cover (FIG. 2, 28) outer surface has an aesthetically pleasing and continuous contoured surface.

FIG. 12 shows an exploded view of a preferred embodiment of a flip 20 and strip antenna hinge assembly 120 of the instant invention. The radiotelephone body 15 preferably includes a frame end piece 155 which is positioned such that it defines the end portion of the radiotelephone body 15. The frame piece 155 preferably includes a pair of spaced-apart frame bosses 221, 222. The space between the bosses 221, 222 is sized and configured to receive the mating portion of the flip hinge 23. The frame 155 also receives the RF feed 125 and positions the feed 125 such that it is proximate to the RF signal path associated with the antenna 30. The female RF connector 106 is fixedly positioned in the frame 155 such that the RF feed 125 is inserted into the RF feed aperture 125A in the female RF connector 106. As such, the antenna RF signal path is defined by the radiating element 33 in the antenna 30 which is electrically connected to the male RF connector 102, which engages to the RF female connector 106, which in turn contacts the RF feed 125. The RF feed 125 is operably associated with the operating circuitry of the radiotelephone (not shown) (i.e., the printed circuit board disposed inside the radiotelephone body 15).

Referring again to FIG. 12, to assemble the pivotable flip 20 and antenna 30, a load spring 108 and flex circuit 230 are preferably inserted into the cavity in the flip. The flip hinge 23 is then positioned between the frame bosses, 221, 222. Bearing retainers 110, 240 are inserted into opposing cavities of the frame bosses 221, 222, respectively. The bearing retainers 240, 110 each extend a predetermined distance into the flip hinge 23 cavity. Preferably, the bearing retainers 110, 240 are press-fit into the frame and the adjacent flip cavity. Next, the female RF connector 106 is positioned in the bearing retainer 110 and rotated and locked into a preferred pre-load position, i.e., abutting the load spring 108. The flex circuit 230 is fed through the bearing retainer 240 and the RF feed 125 is assembled to the frame 155 such that it connects to the RF connector 106. As shown in FIG. 12, a shaft 250 is inserted into the bearing retainer 240 such that it locks against the flip hub (designated in FIG. 13 as 251) and extends to rest against the inner diameter 106A of the RF connector 106. Preferably, the shaft uses a square key feature to lock to the flip hub 251. A damper 260 is positioned on the shaft 250 on the opposing end 250A the RF connector 106. In position, the shaft 250 is supported between the damper 260 and the RF connector 106. An end cap 270 locks the damper 260 in position. The antenna subassembly 300 is positioned over a portion of the bearing retainer 110, with the male RF connector 102 electrically connecting to the female RF connector 106.

Figure 13:
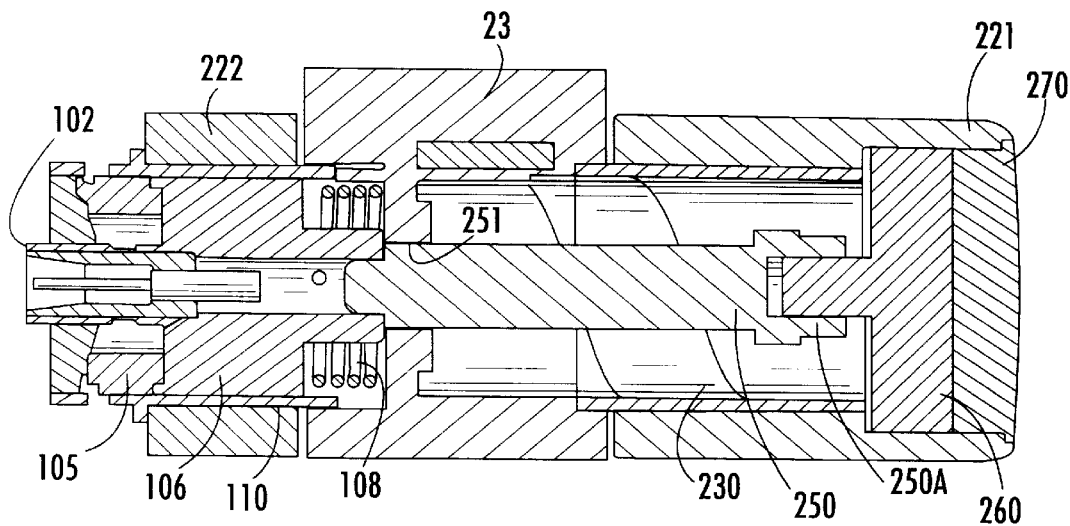
FIG. 13 is a section view of the assembly shown in FIG. 12.
Figure 13A:
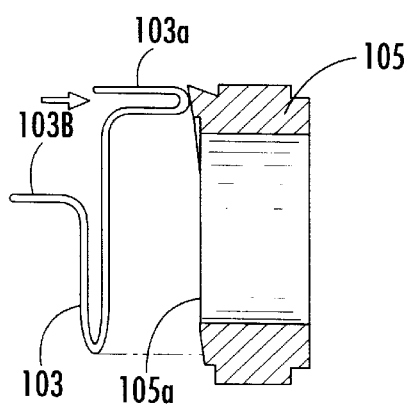
FIG. 13A is an enlarged partial section view of the stationary cam and rotary spring shown in FIG. 13.
Figure 13B:
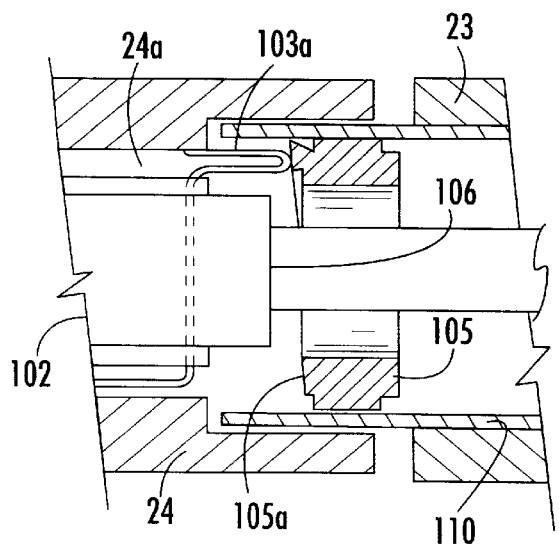
FIG. 13B illustrates the assembled position of the detent spring and stationary cam shown in FIG. 13A.

FIG. 13 illustrates a section view of an assembled flip and antenna hinge assembly of the preferred embodiment shown in FIG. 12 and discussed above. In operation, the antenna 30 is mounted to the radiotelephone such that it rotates or pivots about the antenna hinge 24 which is rotatably or pivotally mounted to the radiotelephone via the bearing retainer 110. The spring 103 (FIG. 8) rides against the cam face formed on the stationary side of the RF connector interface (male to female). The spring 103 can provide added force at antenna open and closed positions to facilitate one or more of full deployment and closure. The cam is preferably formed such that the rotational force vector changes during antenna opening and/or closing.

The flip 20 is mounted to the radiotelephone body 15 such that it rotates about the flip hinge 23 which is rotatably or pivotally attached to the frame 155. As shown, as the flip rotates, it rides on the outer surfaces of the two bearing retainers 110, 240.

In a preferred embodiment, the offset (shown as 75 in FIG. 6) allows the antenna 30 to rotate inwardly towards the flip during closure to lock together in the stow position. In an additional preferred embodiment, the antenna mounting structure provides the offset via the attachment of one or more of the RF connectors 102, 106 with the body of the antenna 24. For example, an offset can be achieved by increasing the clearance between the antenna body 24 and the bearing retainer 110 to allow the force of the detent spring 103 to create an offset angle.

Figure 14:
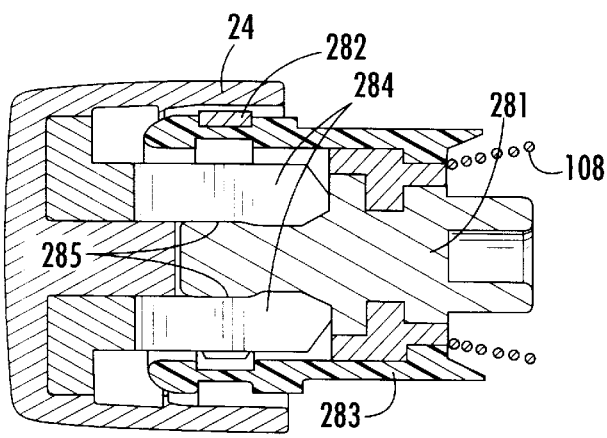
FIG. 14 is a section view of an additional embodiment flip and antenna hinge assembly according to the present invention.

FIG. 14 shows another preferred embodiment of a hinge assembly according to the present invention. The components described above for the flip and the frame are substantially the same in this embodiment. This embodiment reconfigures the antenna mounting structure and can also reconfigure the RF signal path coupling between the antenna and the printed circuit board in the housing. For example, one type of alternate coupling known to those of skill in the art is a helix coupling such as that proposed in U.S. Pat. No. 4,121,218 issued to Irwin et al. which describes an antenna electrical connection. The contents of this disclosure are hereby incorporated by reference as if recited in fill herein. Additional antenna coupling configurations and antenna embodiments are described in co-pending and co-assigned patent application identified by U.S. patent application Ser. No. 09/217,049 entitled "Antenna Electrical Coupling Configurations", the contents of which is hereby incorporated by reference as if recited in full herein.

Figure 15:
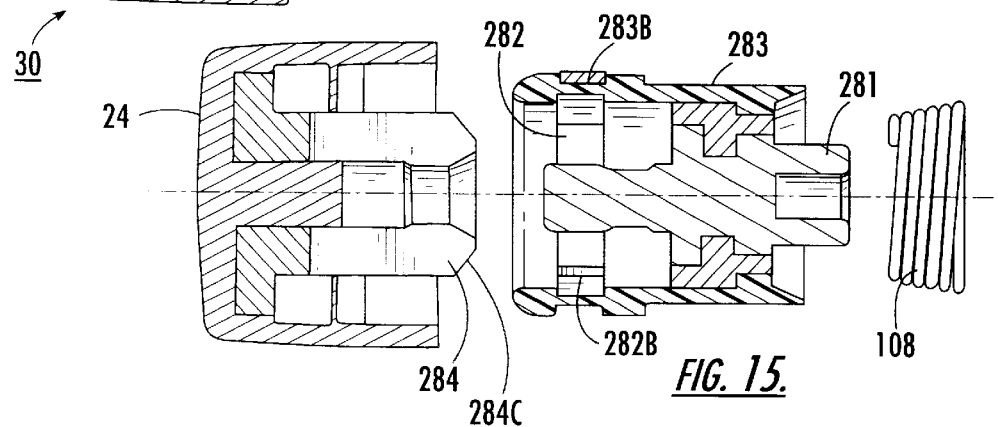
FIG. 15 is an exploded view of the assembly shown in FIG. 14.
Figure 16:
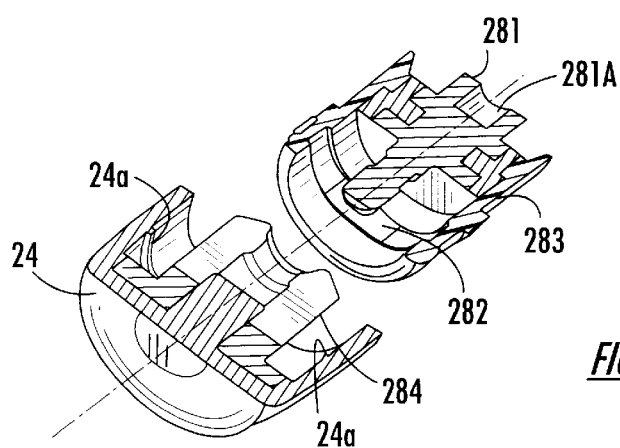
FIG. 16 is a partial section perspective view of the assembled detent cam and bearing retainer assembly and detent spring shown in FIG. 15.
Figure 17:
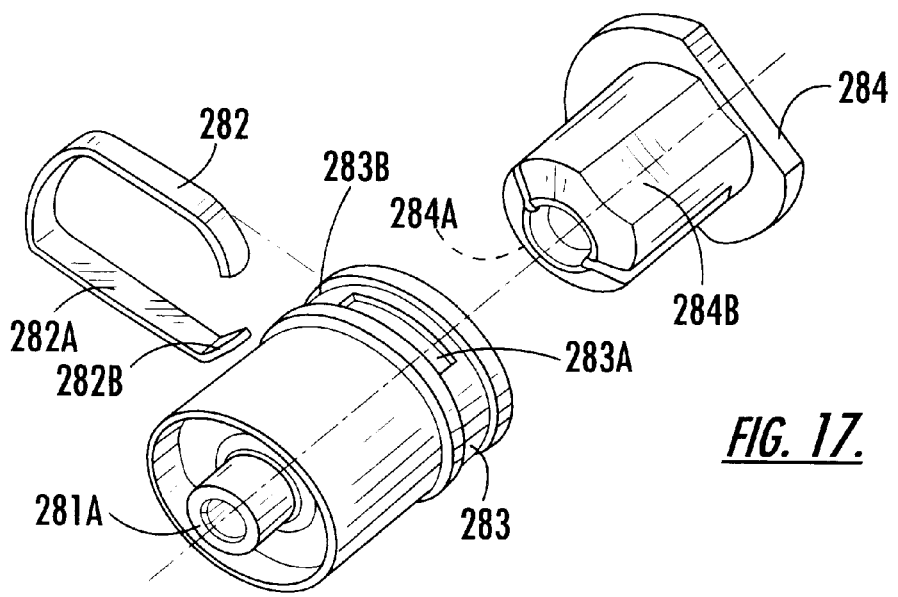
FIG. 17 is a perspective exploded view of the detent cam and spring and bearing assembly shown in FIG. 16.

Referring to FIG. 15, this embodiment includes a detent cam 284, a bearing retainer assembly 283, and a bearing retainer detent spring 282. FIG. 17 illustrates the detent cam 284, separate from the antenna 24, as well as the detent spring 282 separate from the bearing retainer assembly 283. The detent cam 284 has a body with a contoured outer surface which provides a cam surface. The contour is selected such that the antenna will have a tendency to open and close to predetermined positions. As shown in FIG. 17, the body includes two flat or planar segments 284A, 284B which are spaced apart by inclined or curved segments. As shown in FIG. 16, the detent cam 284 is fixedly attached to the shell or hinge cavity 24a of the antenna 30 (bonded, insert molded and the like). As such, the detent cam 284 rotates with extension and retraction of the antenna.

Referring again to FIG. 17, the bearing retainer assembly 283 includes apertures 283A. The detent spring 282 is assembled to the bearing retainer assembly 283 such that the detent spring 282 hugs a portion of the outside wall 283B of the bearing retainer assembly 283. The short portion of the detent spring 282 extends into the inner cavity of the cylindrical bearing retainer assembly 283. As shown in the sectional views of FIGS. 14 and 15, the elongated leg 282A preferably extends across a major portion of the bearing retainer assembly 283, but stops at a distance above the opposing wall. As shown in FIG. 17, the detent spring 282 also includes a foot portion 282B. This foot portion 282B, when assembled, is configured with a clearance between the detent cam 284 outer wall and the inner wall of the bearing retainer assembly 283. In addition, it is preferred that the detent spring 282 be sized and configured to pre-load the spring. Upon assembly, the detent cam front surface 284C pushes the detent spring 282 apart. Thus, this insertion pushes the spring leg 282B open so that the detent spring is under tension, i.e., "is preloaded." In operation, the detent spring lower foot portion 282B rides against the detent cam outer surface profile 284A, 284B to provide the force differential associated with antenna actuation. Preferably the detent spring is formed from 17-7 stainless steel (about 0.4 mm thick) which is tempered or hardened according to standard treatment. Other materials can also be used, including, but not limited to, beryllium copper and the like. It is also preferred that the detent cam 284 be formed from molded acetal resin Delrin™.

As shown in FIGS. 14, 15, and 16, the bearing retainer assembly 283 also includes a shaft 281 which is affixed to the bearing retainer. The bearing retainer assembly 283 and the internal shaft 281 are stationary when positioned in the frame. The shaft 281 includes a receiving opening 281A for supporting the damper shaft 250 as discussed in the first embodiment above. Referring to FIG. 14, upon assembly, the detent cam 284 is inserted into the antenna cavity 24A and fixed to the antenna 30. The internal shaft 281A of the bearing retainer assembly 283 (with the inserted detent spring 282 in place) is positioned in the antenna cavity 24A (FIG. 16) such that the internal shaft 281 is held by the internal walls 285 of the detent cam 284. Preferably, the inner shaft 281 is made of polished stainless steel; the detent cam inner wall rides on this shaft. The wall of the shell or cavity is positioned over the bearing retainer 283 so that the wall surface rides on the bearing outer wall as the antenna rotates. Preferably, the bearing retainer outer wall is formed from a cast or turned brass outer shell and the inner shaft 281 is attached to the outer shell via bonding, insert molding, brazing, welding, or other attachment means.

Figure 18:
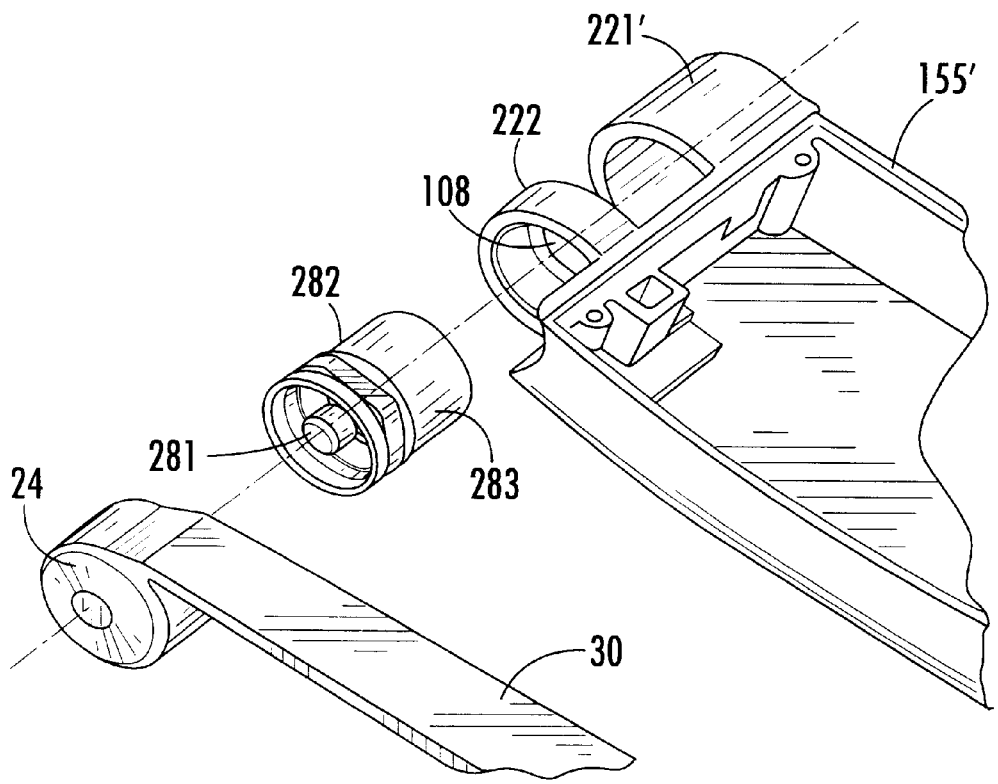
FIG. 18 is an exploded view of the bearing assembly of FIG. 14 shown relative to the radiotelephone body.

The opposing end of the internal shaft 281A is positioned in the radiotelephone such that it captures the damper shaft 250 (FIG. 13). As shown in FIG. 18, the bearing retainer assembly is preferably press-fit into the radiotelephone housing 155'(hinge portion 222) such that the flip hinge 23 rides on the outer surface thereof. The load spring 108 is preferably positioned intermediate the bearing retainer assembly 283 and the flip hinge portion 23. Preferably, the force or loading of the flip 20 and antenna 30 are independent. As such, the detent spring/cam 284, 282 provides the loading for the antenna, while the main spring 108 and flip mounting arrangement provides the loading for the flip 20.

It is also preferred that the bearing retainer assembly 283 include a set of ribs (not shown) on the exterior thereof, and that a corresponding segment of the radiotelephone frame include keyed slots (also not shown) for receiving the exterior ribs. This configuration can help keep or retain the bearing retainer in position as the components can be subjected to handling forces (i.e., dropped) which can misalign or move the components. This can also help keep the bearing retainer in its preferred position since the flip is also preferably pre-loaded. Additional details of the preferred mounting structure and biasing structures can be found in co-assigned and co-pending patent application identified by U.S patent application Ser. No. 09/217,048. The content of this application is hereby incorporated by reference as if recited in full herein.

In operation, the configurations described above provide a "low-force" translation of the antenna (and the flip). As used herein, the term "low-force" means spring forces on the order of about 5–7 Ncm, and preferably less than about 5 cm. As regards the second embodiment described, the detent spring foot 282B rides against (follows) the surface of the detent cam 284. As such, the actuation force exerted on the antenna is dependent on the spring loaded force introduced to the attached detent cam. This actuation force varies as the spring force increases and decreases as the cam surface rises and falls according to the profile (the planar segments 284A, 284B and the adjacent inclined segments). Preferably, the detent spring floats at 0 degrees and 210 degrees (is not loaded) and extends to ride in tension and loaded against the cam at the angles therebetween.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A radiotelephone, comprising:
   a radiotelephone housing having opposing top and bottom surfaces and a width corresponding to the span of said housing;
   a strip antenna attached to said housing, said strip antenna being rotatable from a first closed position to a second open position, said strip antenna having a width and two opposing sides, the width being less than a major portion of the width of said radiotelephone housing;
   a flip member attached to said housing, said flip member being rotatable from a first closed position to a second open position,
   wherein, in the closed position, said strip antenna and said flip member are configured to overlie said radiotelephone housing top surface, and in the open position, said strip antenna and said flip member can separately rotate and longitudinally extend away from said radiotelephone housing such that said strip antenna and said flip member are positioned spatially apart from each other, and wherein when each of said strip antenna and said flip are in the closed position, at least one of said strip antenna sides is configured to matably attach to said flip member so as to releasably engage and positively lock said flip member and strip antenna together proximate said top surface of said housing to define an outer cover for said housing so that each of said strip antenna and said flip member form a portion of the perimeter of the cover.

2. A radiotelephone according to claim 1, wherein, in the closed position, said flip member and said strip antenna define a substantially continuous arched profile cover which overlies a major portion of said radiotelephone.

3. A radiotelephone according to claim 1, said radiotelephone housing having opposing first and second ends connected to said top surface, wherein said strip antenna and said flip member are attached along said first end of said housing, and wherein said strip antenna includes an associated planar radiating element comprising a flexible substrate material.

4. A radiotelephone according to claim 1, wherein said strip antenna is a flexible strip antenna, wherein at least one side of said strip antenna is configured with a beveled edge portion, wherein said flip member includes a top surface with a recess sized and configured to matably receive said strip antenna beveled edge portion therein when said strip antenna and flip member are in the closed position so as to trap and thereby positively lock said beveled edge portion of said strip antenna in a mating side portion of the recess.

5. A radiotelephone according to claim 1, said housing including downwardly extending side portions attached to said top surface, said flip member including opposing first and second sides, wherein at least one of said flip member sides extends to wrap around a portion of said radiotelephone top surface to releasably engage with a side portion of said housing when in the closed position.

6. A radiotelephone according to claim 1, wherein said flip member second position is about at least 135 degrees from said radiotelephone housing top surface and said strip antenna second position is at least about 180 degrees from said radiotelephone housing top surface.

7. A radiotelephone according to claim 1, wherein said strip antenna is a flexible strip antenna, and wherein said flip member includes a recess formed therein, said recess being sized and configured to receive said strip antenna therein, wherein each of said flip member and said strip antenna have a pair of opposing side portions, and wherein when said strip antenna resides in said flip member recess, adjacent side portions of each of said flip member and said strip antenna define contact portions which matably engage to lock said strip antenna to said flip member.

8. A radiotelephone according to claim 7, wherein said strip antenna is a flexible strip antenna, and wherein said flip member is positioned intermediate said radiotelephone housing top surface and said strip antenna relative to the associated axis of rotation when said flip member and strip antenna are in the open position.

9. A radiotelephone according to claim 8, wherein said strip antenna comprises a planar radiating element, wherein said flip member includes at least one beveled edge which is configured and sized to trap one of said strip antenna sides securely thereunder when said strip antenna and said flip member are in the closed position, and wherein, in the closed position, said strip antenna and said flip member are arranged about the top surface of said housing to define an outer cover which encases the underlying telephone housing.

10. A radiotelephone according to claim 1, wherein said flip member has an outer contour and said strip antenna has an arched profile which is configured to matably align and engage with said flip member to define a substantially continuous profile contoured cover in the closed position.

11. A radiotelephone according to claim 10, wherein said flip hinging portion includes a flip hinge axis and said strip antenna hinging portion includes a strip hinge axis, and wherein said flip hinge axis and said strip hinge axis are non-coaxial.

12. A radiotelephone according to claim 11, wherein said flip hinge axis and said strip hinge axis each correspond to a line which is drawn through the center of the corresponding axis of rotation of each hinging portion and laterally across the body of the radiotelephone to beyond a point of intersection of the two lines, and wherein the flip hinge axis and strip hinge axis are proximately aligned with respect to the other such that said flip hinge axis is angularly offset about three degrees from said strip hinge axis.

13. A radiotelephone according to claim 11, wherein said flip member second position is about 180 degrees and said strip antenna second position is about 210 from said radiotelephone housing top surface.

14. A radiotelephone according to claim 1, wherein said strip antenna is a flexible antenna comprising a planar radiating element, and wherein said housing further includes a flip hinging portion for pivotably attaching said flip member to said housing and a separate spaced apart strip antenna hinging portion for pivotably attaching said strip antenna to said housing.

15. A radiotelephone according to claim 14, wherein said strip antenna translates a through a greater angle of rotation to move into its open position than said flip member as it moves into its open position.

16. A radiotelephone according to claim 15, wherein said strip antenna open position is about at least 30 degrees greater than said flip member.

17. A radiotelephone housing having a blade antenna and flip member, comprising:
  a primary radiotelephone body having opposing first and second end portions;
  a flexible blade antenna having an antenna hinge portion, wherein said antenna hinge portion is pivotably attached to said body first end such that said blade antenna rotates to longitudinally extend above said primary radiotelephone body in an open position and rotates to overlie a portion of said primary radiotelephone body in a stow position; and
  a flip member having a flip hinge portion, wherein said flip hinge portion is pivotably attached to said body first end portion such that said flip member rotates to longitudinally extend above said primary radiotelephone body in an open position and rotates to overlie said primary radiotelephone body adjacent said blade antenna in a stow position, wherein said blade antenna is configured to matably align with and securely engage with said flip member when in the stow position so as to lock said blade antenna to said flip member.

18. A radiotelephone housing according to claim 17, wherein said antenna hinge portion is separate from said flip hinge portion, and wherein said antenna hinge portion is laterally spaced apart from said flip portion along said first end of said primary radiotelephone body, and wherein, in the stow position, each of said blade antenna and said flip member define a portion of an outer surface of a substantially continuous cover configured to overlie said radiotelephone body such that each are externally visible to a user.

19. A radiotelephone housing according to claim 17, said antenna hinge portion including an antenna hinge axis and said flip hinge portion including a flip hinge axis, wherein said antenna hinge axis and said flip hinge axis are coaxial, and wherein said antenna hinge portion is laterally spaced apart from said flip portion along said first end of said primary radiotelephone body.

20. A radiotelephone housing according to claim 17, said antenna hinge portion including an antenna hinge axis and said flip hinge portion including a flip hinge axis, wherein said antenna hinge axis and said flip hinge axis are non-coaxial, and wherein said blade antenna and said flip member are arranged in side by side alignment and, in operation, each is adapted to separately pivot about their respective axis to travel to a laterally spaced apart longitudinally extending operative position, and wherein, in the stow position, each of said blade antenna and said flip member define a portion of an outer surface of a substantially continuous profile cover configured to overlie said radiotelephone body such that each are externally visible to a user.

21. A radiotelephone housing according to claim 20, wherein said blade antenna and flip member are arranged in side by side alignment and said antenna hinge axis is offset at least about three degrees from said flip hinge axis such that said strip antenna and flip member meet and contact as they rotate into their respective closed positions and separate from the other to form a gap as they open above the away from the top surface of said radiotelephone body.

22. A radiotelephone housing according to claim 17, wherein said flip member is positioned intermediate said primary radiotelephone body and said blade antenna when said flip member and said blade antenna are in the stow position, wherein said flip member includes a recess formed therein which is sized and configured to receive said blade antenna therein so that the top of said blade antenna is substantially flush with the top of said flip member, and wherein said blade antenna is configured so as to conform to the shape of the recess.

23. A radiotelephone according to claim 22, wherein said flip member includes recess configured to receive at least a portion of said blade antenna therein.

24. A radiotelephone according to claim 23, wherein said blade antenna rotates a further angular distance away from said radiotelephone body input surface than said flip member as each advances to its open position.

25. A radiotelephone housing according to claim 17, said radiotelephone body including an input surface, wherein, in the stow position, said flip member engages in side by side alignment with said blade antenna to define a cover which overlies and encloses the input surface of said primary radiotelephone body.

26. A radiotelephone according to claim 25, wherein said flip member traps an adjacently positioned side of said antenna in the stow position to define a continuous contoured perimeter surface overlying the radiotelephone body.

27. A method of operating a low-profile radiotelephone having a housing body with an associated width and a strip antenna and flip member with a speaker thereon, comprising the steps of:

rotating the flip member through a first angle of rotation above and away from the radiotelephone body;

rotating the strip antenna a second angle of rotation above and away from the radiotelephone body, the second angle of rotation being greater than the first, wherein the strip antenna is flexibly configured with a substantially flat profile and a width which is less than a major portion of the width of the housing body; and stowing the strip antenna and flip member to overlie the radiotelephone such that the strip antenna and flip member matably engage and form a cover, wherein each of said strip antenna and said flip member define a portion of the outer surface of the cover such that each are externally visible to a user when in the stow position.

28. A method according to claim 27, wherein flip member and strip antennas define a continuous cover in the stow position.

29. A method according to claim 27, further comprising the step of receiving the strip antenna into a recess in the flip member when stowing the antenna.

30. A method according to claim 27, wherein the cover has a continuous contoured profile.

31. According to claim 27, wherein said strip antenna rotating step comprises advancing the strip antenna away from the radiotelephone body such that the strip antenna and flip member are spatially separate and define a lateral gap when positioned at the same angle of opening.

32. A method according to claim 27, the method further comprising releasably securing the flip and strip antenna together in the stow position.

33. A method according to claim 27, the method further comprising the step of trapping at least one side portion of the strip antenna in the adjacently positioned flip member in the stow position to releasably secure the strip antenna and flip member together.

* * * * *